(12) United States Patent
Huang et al.

(10) Patent No.: US 9,568,714 B2
(45) Date of Patent: Feb. 14, 2017

(54) PROJECTION LENS

(71) Applicant: Zhejiang Sunny Optics Co., Ltd., Ningbo (CN)

(72) Inventors: Lin Huang, Ningbo (CN); Fujian Dai, Ningbo (CN)

(73) Assignee: Zhejiang Sunny Optics Co., Ltd. (CN)

( * ) Notice: Subject to any disclaimer, the term of this patent is extended or adjusted under 35 U.S.C. 154(b) by 0 days.

(21) Appl. No.: 14/779,756

(22) PCT Filed: Jan. 30, 2015

(86) PCT No.: PCT/CN2015/072054
§ 371 (c)(1),
(2) Date: Sep. 24, 2015

(87) PCT Pub. No.: WO2016/011802
PCT Pub. Date: Jan. 28, 2016

(65) Prior Publication Data
US 2016/0266358 A1  Sep. 15, 2016

(30) Foreign Application Priority Data

Jul. 22, 2014  (CN) .......................... 2014 1 0351265
Jul. 22, 2014  (CN) ..................... 2014 2 0406113 U (51) Int. Cl.
*G02B 3/02* (2006.01)
*G02B 13/00* (2006.01)
(Continued)

(52) U.S. Cl.
CPC ............. *G02B 13/0065* (2013.01); *G02B 9/12* (2013.01); *G02B 13/0035* (2013.01);
(Continued)

(58) Field of Classification Search
CPC ................................................. G02B 13/0065
(Continued)

(56) References Cited

U.S. PATENT DOCUMENTS

| 7,375,901 | B2 | 5/2008 | Tanaka |
| 2011/0141339 | A1 | 6/2011 | Seo |
| 2011/0141576 | A1* | 6/2011 | Seo ..................... G02B 13/0045 359/683 |

FOREIGN PATENT DOCUMENTS

| CN | 101042463 A | 9/2007 |
| CN | 103901586 A | 7/2014 |

(Continued)

OTHER PUBLICATIONS

International Search Report for Application No. PCT/CN2015/072054 dated Apr. 29, 2015.

*Primary Examiner* — James Jones
(74) *Attorney, Agent, or Firm* — Lerner, David, Littenberg, Krumholz & Mentlik, LLP (57) ABSTRACT

Provided is a projection lens including: a first lens, a reflective optical device, a second lens and a third lens from an image side of the projection lens to an object side of the projection lens in turn. The first lens is of a negative focal power, an image side of the first lens is concave; the reflective optical device enables light to be bended; the second lens is of a positive focal power, an object side of the second lens is convex; the third lens is of a positive focal power, an object side of the third lens is convex. A diaphragm is arranged between first lens and second lens, the projection lens meets: 0.4<ImgH/D<0.7, wherein ImgH equals to a half-length of an object diagonal, D represents a vertical height from the image side of the first lens to a center axis perpendicular to an object.

19 Claims, 6 Drawing Sheets

(51) Int. Cl.
   *G02B 9/12*      (2006.01)
   *G02B 13/16*     (2006.01)
   *G02B 13/14*     (2006.01)
   *G02B 27/00*     (2006.01)
   *G06K 9/00*      (2006.01)

(52) U.S. Cl.
   CPC ............ *G02B 13/14* (2013.01); *G02B 13/16* (2013.01); *G02B 27/0025* (2013.01); *G06K 9/00335* (2013.01)

(58) Field of Classification Search
   USPC .......................................................... 359/716
   See application file for complete search history.

(56) References Cited

FOREIGN PATENT DOCUMENTS

CN      104142566 A    11/2014
   CN      204009210 U    12/2014

* cited by examiner

PROJECTION LENS

CROSS-REFERENCE TO RELATED APPLICATION

The application is a U.S. national phase of PCT Application No. PCT/CN2015/072054, filed on Jan. 30, 2015, which claims the benefit of the filing date of Chinese Patent Application No. 201410351265.6 and No. 201420406113.7, both filed with the State Intellectual Property Office of P. R. China on Jul. 22, 2014, the entire contents of which are incorporated herein by reference.

FIELD

The present disclosure relates to an optical projection system, and more particularly to a projection lens.

BACKGROUND

In recent years, with the development of an imaging technology, a projection lens for projecting has a wider and wider application range; and an interactive projection device has growing up gradually. In order to be suitable to the miniaturization of an electronic device and meet the interactive demands, it is required to ensure the projection lens miniaturization and sufficient field angle, as well as high imaging quality and being capable of acquiring information. A conventional projection lens for projecting, which is generally used for imaging, may encompass many lenses to eliminate various aberrations, improving resolution but resulting in an increasing length of the projection lens, which is adverse to miniaturization. Besides, a projection lens for projecting being of a large filed angle generally has serious distortion and low imaging quality.

The interactive device achieves an interactive function such as multi-point touch and gesture recognition mainly based on a process including: generating a signal through a projection lens for projecting; capturing an image by an imaging lens; and extracting information with image processing software. Accordingly, quality of the analog signal generated by the projection lens for projecting plays a critical role in extracting information with high precision. It is more easily to extract information under an infrared spectrum due to its characteristic per se, which may avoid adverse effects by filtering out visible light.

Therefore, the present disclosure provides in embodiments a projection lens, which may be used in the interactive device and applied under the infrared spectrum.

SUMMARY

Embodiments of the present disclosure seek to solve at least one of the problems existing in the related art.

The projection lens according to embodiments of the present disclosure, includes a first lens, a reflective optical device, a second lens and a third lens from an image side of the projection lens to an object side of the projection lens in turn, wherein the first lens is of a negative focal power, an image side of the first lens is concave;

the reflective optical device enables a light path to be bended;

the second lens is of a positive focal power, an object side of the second lens is convex;

the third lens is of a positive focal power, an object side of the third lens is convex, wherein a diaphragm is arranged between the first lens and the second lens, the projection lens meets the following formula:

$$0.4 < ImgH/D < 0.7,$$

wherein ImgH equals to a half-length of an object diagonal,

D represents a vertical height from the image side of the first lens to a center axis perpendicular to an object.

In some embodiments, each of the first lens and the second lens has two sides both being in an aspheric shape, the third lens has two sides both being in a spherical shape.

In some embodiments, the third lens is made of a glass material.

In some embodiments, the projection lens meets the following formula:

$$3 < f3/f < 6,$$

wherein f3 represents a focal length of the third lens, f represents a focal length of the projection lens.

In some embodiments, the projection lens meets the following formula:

$$0.2 < (R3+R4)/(R3-R4) < 1.2,$$

wherein R3 represents a curvature radius of an image side of the second lens, R4 represents a curvature radius of the object side of the second lens.

In some embodiments, the projection lens meets the following formula:

$$0.2 < (R5+R6)/(R5-R6) < 1.2,$$

wherein R5 represents a curvature radius of an image side of the third lens, R6 represents a curvature radius of the object side of the third lens.

In some embodiments, an object side of the first lens is convex.

In some embodiments, the image side of the second lens is convex.

In some embodiments, the image side of the third lens is convex.

In some embodiments, the reflective optical device enabling the light path to be bended is a reflecting prism or a reflecting plane mirror.

The projection lens according to embodiments of the present disclosure has a large field angle and a large aperture, and miniaturization.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, which are used to illustrate the present disclosure, but shall not be construed to limit the present disclosure.

In the description of the present disclosure, it is to be understood that terms such as "first" and "second" are used herein for purposes of description and are not intended to indicate or imply relative importance or to imply the number of indicated technical features. Thus, the features defined with "first" and "second" may explicitly or implicitly include one or more of these features. Furthermore, in the description of the present disclosure, "a plurality of" means two or more than two, unless be specified otherwise.

In the description of the present disclosure, it is to be understood unless specified or limited otherwise, terms such as "mounted", "connected" and "coupled" should be understood broadly, and may be, for example, fixed connections, detachable connections, or integral connections; or may be mechanical connections, electrical connections, or mutual communication; or may be direct connections, indirect connections via intervening structures, connections of inner of two elements, or an interaction relationship between two element, which can be understood by those skilled in the art according to specific situations.

The following description provides a plurality of embodiments or examples configured to achieve different structures of the present disclosure. In order to simplify the publishment of the present disclosure, components and dispositions of the particular embodiment are described in the following, which are only explanatory and not construed to limit the present disclosure. In addition, the present disclosure may repeat the reference number and/or letter in different embodiments for the purpose of simplicity and clarity, and the repeat does not indicate the relationship of the plurality of embodiments and/or dispositions. Furthermore, examples of different processes and materials are provided in the present disclosure. However, it would be appreciated by those skilled in the art that other processes and/or materials may be also applied.

The projection lens according to embodiments of the present disclosure, includes a first lens, a reflective optical device, a second lens and a third lens from an image side of the projection lens to an object side of the projection lens in turn, wherein the first lens is of a negative focal power, an image side of the first lens is concave;

the reflective optical device enables a light path to be bended;

the second lens is of a positive focal power, an object side of the second lens is convex;

the third lens is of a positive focal power, an object side of the third lens is convex, each of the first lens and the second lens has two sides both being in an aspheric shape, the third lens has two sides both being in a spherical shape.

A diaphragm is arranged between the first lens and the second lens. The third lens is made of a glass material. A structure of plastic lens inserted with glass lenses, which are designed into a reasonable shape, may effectively eliminate adverse influence on the lens introduced by a thermal difference.

ImgH equals to a half-length of an object diagonal, D represents a vertical height from the image side of the first lens to a center axis perpendicular to an object. The projection lens meets the following formula:

$$0.4 < ImgH/D < 0.7.$$

The satisfaction of the above formula is favor of the characteristic of miniaturization, so as to be used in a portable product.

f3 represents a focal length of the third lens, f represents a focal length of the projection lens. The projection lens meets the following formula:

$$3 < f3/f < 6.$$

The third lens made of a glass material and meeting the foregoing formula may effectively eliminate adverse influence on the projection lens introduced by the thermal difference and benefits to telecentric characteristics.

R3 represents a curvature radius of an image side of the second lens, R4 represents a curvature radius of the object side of the second lens, the projection lens meets the following formula:

0.2<(R3+R4)/(R3−R4)<1.2.

The second lens meets the requirement of the above formula, which benefits to the telecentricity and improves the imaging quality.

R5 represents a curvature radius of an image side of the third lens, R6 represents a curvature radius of the object side of the third lens, the projection lens meets the following formula:

0.2<(R5+R6)/(R5−R6)<1.2.

The third lens meets the above formula, which benefits to the telecentric characteristic, allowing the light to be maintained in a uniform manner without any vignette, and corrects the distortion.

The object side of the first lens is convex.
The image side of the second lens is convex.
The image side of the third lens is convex.
The reflective optical device enabling the light path to be bended is a reflecting prism or a reflecting plane mirror.

The projection lens according to embodiments of the present disclosure uses three lenses, so as to achieve technical effects of a large field angle, a large aperture and miniaturization. Combining plastic with glass and distributing different focal powers may reduce the production cost and eliminate adverse influence on the system introduced by the thermal difference, as well as achieve the telecentric characteristic.

A surface shape of the aspheric shape is defined by a formula as follows:

$$x = \frac{ch^2}{1+\sqrt{1-(k+1)c^2h^2}} + \sum A_i h^i.$$

wherein h is a height from any point on the aspheric shape to an optical axis, c is an apex curvature, k is a conic coefficient, Ai is a coefficient for the i-th order of the aspheric.

Figure 1:
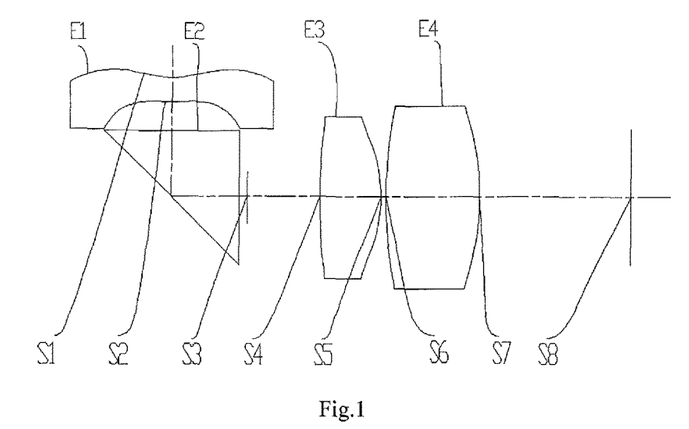
FIG. 1 is a schematic view showing a main structure of the projection lens according to Embodiment 1 of the present disclosure.

Referring to FIG. 1, in Embodiment 1, the projection lens includes a first lens E1, a reflective optical device E2, a second lens E3 and a third lens E4 from an image side of the projection lens to an object side of the projection lens in turn, wherein the first lens E1 is of a negative focal power, an image side of the first lens is concave and an object side of the first lens is convex, each of the image side and the object side thereof is in an aspheric shape; the reflective optical device E2 enables a light path to be bended; the second lens E3 is of a positive focal power, an image side of the second lens is convex and an object side of the second lens is convex, each of the image side and the object side thereof is in an aspheric shape; the third lens E4 is of a positive focal power, an image side of the third lens is convex and an object side of the third lens is convex, each of the image side and the object side thereof is in a spherical shape; a diaphragm is arranged between the first lens E1 and the second lens E3; in the projection lens, the third lens E4 is made of a glass material.

From the image side of the projection lens to the object side of the projection lens, two sides of the first lens E1 are S1 and S2, respectively; the diaphragm is S3; two sides of the second lens E3 are S4 and S5, respectively; two sides of the third lens E4 are S6 and S7, respectively; and the side of the object is S8.

In Embodiment 1, each of the parameters is described as below: TTL=11.10; f1=−3.58; f2=4.45; f3=5.53; f=1.56;

*f3/f*=3.56;

ImgH/D=0.58;

(R3+R4)/(R3−R4)=0.74;

(R5+R6)/(R5−R6)=0.25;

System parameter: Fno. is 2.8

TABLE 1

| No. of surface | Surface type | Curvature radius | Thickness | Material | Conic coefficient |
|---|---|---|---|---|---|
| obj | spherical | infinity | 467.0000 | | |
| 1 | aspheric | −1.2163 | 0.4717 | 1.5351/55.7797 | −8.6544 |
| 2 | aspheric | −3.8848 | 0.5552 | | −150.6171 |
| 3 | spherical | infinity | 2.5500 | 1.5168/64.1983 | |
| 4 | spherical | infinity | 0.1000 | | |
| stop | spherical | infinity | 1.4357 | | |
| 6 | aspheric | 17.8461 | 1.1684 | 1.5351/55.7797 | −60.3983 |
| 7 | aspheric | −2.6404 | 0.0921 | | −2.6443 |
| 8 | spherical | 8.7790 | 1.8211 | 1.6385/55.4496 | |
| 9 | spherical | −5.3074 | 2.9059 | | |
| IMG | spherical | infinity | | | |

The table below shows high-order coefficients A4, A6, A8, A10 and A12 of aspheric shapes of the aspheric lens.

TABLE 2

| No. of surface | A4 | A6 | A8 | A10 | A12 | A14 | A16 |
|---|---|---|---|---|---|---|---|
| 1 | 1.1192E−01 | −3.8564E−02 | 7.6475E−03 | 4.5286E−05 | −4.5501E−04 | 1.1758E−04 | −1.0982E−05 |
| 2 | 3.0015E−01 | −2.1827E−01 | 2.6531E−01 | −1.6131E−01 | −3.0270E−03 | 4.9111E−02 | −1.5123E−02 |

TABLE 2-continued

| No. of surface | A4 | A6 | A8 | A10 | A12 | A14 | A16 |
|---|---|---|---|---|---|---|---|
| 6 | 4.4291E−03 | 6.3563E−03 | −2.7209E−03 | 1.1149E−03 | −1.7835E−03 | 1.0267E−03 | −1.1724E−04 |
| 7 | −4.4377E−03 | 1.8424E−04 | 2.8210E−03 | −1.2475E−03 | 1.1221E−03 | −7.8880E−04 | 1.8278E−04 |

Figure 6:
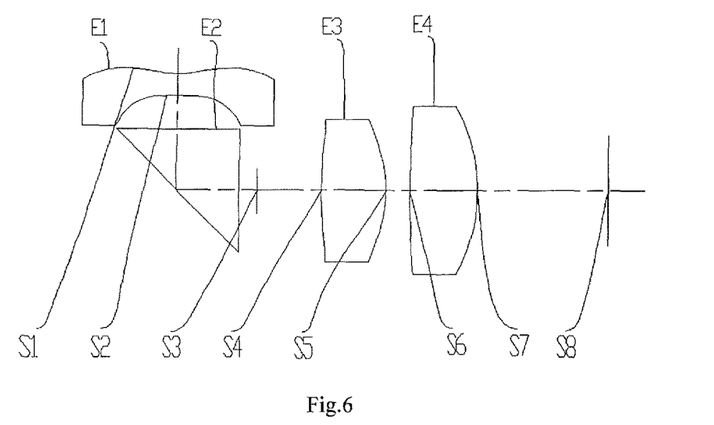
FIG. 6 is a schematic view showing a main structure of the projection lens according to Embodiment 2 of the present disclosure.

Referring to FIG. 6, in Embodiment 2, the projection lens includes a first lens E1, a reflective optical device E2, a second lens E3 and a third lens E4 from an image side of the projection lens to an object side of the projection lens in turn, wherein the first lens E1 is of a negative focal power, an image side of the first lens is concave and an object side of the first lens is concave, each of the image side and the object side thereof is in an aspheric shape; the reflective optical device E2 enables a light path to be bended; the second lens E3 is of a positive focal power, an image side of the second lens is convex and an object side of the second lens is convex, each of the image side and the object side thereof is in an aspheric shape; the third lens E4 is of a positive focal power, an image side of the third lens is convex and an object side of the third lens is convex, each of the image side and the object side thereof is in a spherical shape; a diaphragm is arranged between the first lens E1 and the second lens E3; in the projection lens the third lens E4 is made of a glass material.

From the image side of the projection lens to the object side of the projection lens, two sides of the first lens E1 are S1 and S2, respectively; the diaphragm is S3; two sides of the second lens E3 are S4 and S5, respectively; two sides of the third lens E4 are S6 and S7, respectively; and the side of the object is S8.

In Embodiment 2, each of the parameters is described as below: TTL=10.69; f1=−2.99; f2=3.7; f3=4.92; f=1.26;

$f3/f=3.9$;

$ImgH/D=0.45$;

$(R3+R4)/(R3-R4)=0.6$;

$(R5+R6)/(R5-R6)=0.7$;

System parameter: Fno. is 2.8.

TABLE 3

| No. of surface | Surface type | Curvature radius | Thickness | Material | Conic coefficient |
|---|---|---|---|---|---|
| obj | spherical | infinity | 467.0000 | | |
| 1 | aspheric | −1.6010 | 0.4265 | 1.5351/55.7797 | −10.1953 |
| 2 | aspheric | 101.0876 | 0.6491 | | 100.0002 |
| 3 | spherical | infinity | 2.6348 | 1.5168/64.1983 | |
| 4 | spherical | infinity | 0.1391 | | |
| stop | spherical | infinity | 1.2536 | | |
| 6 | aspheric | 9.3840 | 1.2821 | 1.5351/55.7797 | −62.7585 |
| 7 | aspheric | −2.3465 | 0.4794 | | −2.9212 |
| 8 | spherical | 20.1827 | 1.3155 | 1.6385/55.4496 | |
| 9 | spherical | −3.5629 | 2.5110 | | |
| IMG | spherical | infinity | | | |

The table below shows high-order coefficients A4, A6, A8, A10 and A12 of aspheric shapes of the aspheric lens.

TABLE 4

| No. of surface | A4 | A6 | A8 | A10 | A12 | A14 | A16 |
|---|---|---|---|---|---|---|---|
| 1 | 1.1315E−01 | −3.8444E−02 | 7.6267E−03 | 3.5348E−05 | −4.6155E−04 | 1.1602E−04 | −1.0199E−05 |
| 2 | 3.2052E−01 | −2.1275E−01 | 2.6765E−01 | −1.6027E−01 | −2.7766E−03 | 4.9352E−02 | −1.5239E−02 |
| 6 | 3.3334E−03 | 5.5444E−03 | −1.1355E−03 | 2.2652E−03 | −1.5160E−03 | 6.8382E−04 | −6.1948E−04 |
| 7 | −6.3743E−03 | 7.7130E−05 | 3.0859E−03 | −8.7950E−04 | 1.4701E−03 | −8.0020E−04 | 8.3962E−05 |

Figure 11:
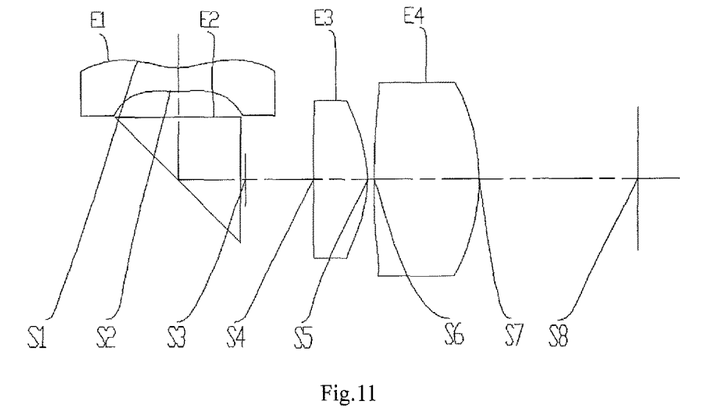
FIG. 11 is a schematic view showing a main structure of the projection lens according to Embodiment 3 of the present disclosure.

Referring to FIG. 11, in Embodiment 3, the projection lens includes a first lens E1, a reflective optical device E2, a second lens E3 and a third lens E4 from an image side of the projection lens to an object side of the projection lens in turn, wherein the first lens E1 is of a negative focal power, an image side of the first lens is concave and an object side of the first lens is convex, each of the image side and the object side thereof is in an aspheric shape; the reflective optical device E2 enables a light path to be bended; the second lens E3 is of a positive focal power, an image side of the second lens is concave and an object side of the second lens is convex, each of the image side and the object side thereof is in an aspheric shape; the third lens E4 is of a positive focal power, an image side of the third lens is convex and an object side of the third lens is convex, each of the image side and the object side thereof is in a spherical shape; a diaphragm is arranged between the first lens E1 and the second lens E3; in the projection lens, the third lens E4 is made of a glass material.

From the image side of the projection lens to the object side of the projection lens, two sides of the first lens E1 are S1 and S2, respectively; the diaphragm is S3; two sides of the second lens E3 are S4 and S5, respectively; two sides of the third lens E4 are S6 and S7, respectively; and the side of the object is S8.

In Embodiment 3, each of the parameters is described as below: TTL=11.5; f1=−3.69; f2=4.82; f3=5.29; f=1.66;

$f3/f=3.19;$ $ImgH/D=0.63;$ $(R3+R4)/(R3-R4)=1.01;$ $(R5+R6)/(R5-R6)=0.58;$

System parameter: Fno. is 2.8.

TABLE 5

| No. of surface | Surface type | Curvature radius | Thickness | Material | Conic coefficient |
|---|---|---|---|---|---|
| obj | spherical | infinity | 467.0000 | | |
| 1 | aspheric | −1.2123 | 0.4774 | 1.5351/55.7797 | −9.0087 |
| 2 | aspheric | −3.6559 | 0.5100 | | −139.7000 |
| 3 | spherical | infinity | 2.5524 | 1.5168/64.1983 | |
| 4 | spherical | infinity | 0.0513 | | |
| stop | spherical | infinity | 1.4025 | | |
| 6 | aspheric | −399.9996 | 1.0971 | 1.5351/55.7797 | 499.8527 |
| 7 | aspheric | −2.5291 | 0.1267 | | −2.7015 |
| 8 | spherical | 15.0123 | 2.0931 | 1.6385/55.4496 | |
| 9 | spherical | −4.0415 | 3.1857 | | |
| IMG | spherical | infinity | | | |

The table below shows high-order coefficients A4, A6, A8, A10 and A12 of aspheric shapes of the aspheric lens.

TABLE 6

| No. of surface | A4 | A6 | A8 | A10 | A12 | A14 | A16 |
|---|---|---|---|---|---|---|---|
| 1 | 1.1185E−01 | −3.8569E−02 | 7.6467E−03 | 4.2051E−05 | −4.5795E−04 | 1.1673E−04 | −1.0594E−05 |
| 2 | 2.9979E−01 | −2.1847E−01 | 2.6502E−01 | −1.6168E−01 | −3.3097E−03 | 4.8987E−02 | −1.5045E−02 |
| 6 | 3.1837E−03 | 5.6990E−03 | −3.0622E−03 | 9.2828E−04 | −1.8127E−03 | 1.0557E−03 | −1.1471E−04 |
| 7 | −4.5767E−03 | −2.8222E−04 | 2.5765E−03 | −1.2275E−03 | 1.1901E−03 | −7.7192E−04 | 1.6160E−04 |

Figure 16:
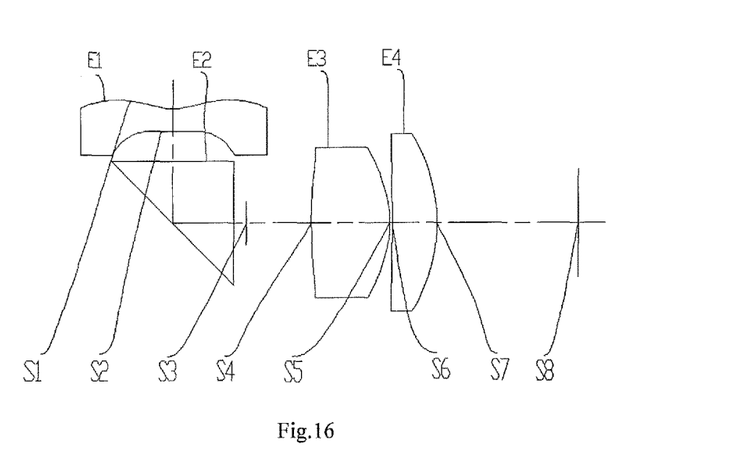
FIG. 16 is a schematic view showing a main structure of the projection lens according to Embodiment 4 of the present disclosure.

Referring to FIG. 16, in Embodiment 4, the projection lens includes a first lens E1, a reflective optical device E2, a second lens E3 and a third lens E4 from an image side of the projection lens to an object side of the projection lens in turn, wherein the first lens E1 is of a negative focal power, an image side of the first lens is concave and an object side of the first lens is convex, each of the image side and the object side thereof is in an aspheric shape; the reflective optical device E2 enables a light path to be bended; the second lens E3 is of a positive focal power, an image side of the second lens is convex and an object side of the second lens is convex, each of the image side and the object side thereof is in an aspheric shape; the third lens E4 is of a positive focal power, an image side of the third lens is concave and an object side of the third lens is convex, each of the image side and the object side thereof is in a spherical shape; a diaphragm is arranged between the first lens E1 and the second lens E3; in the projection lens, the third lens E4 is made of a glass material.

From the image side of the projection lens to the object side of the projection lens, two sides of the first lens E1 are S1 and S2, respectively; the diaphragm is S3; two sides of the second lens E3 are S4 and S5, respectively; two sides of the third lens E4 are S6 and S7, respectively; and the side of the object is S8.

In Embodiment 4, each of the parameters is described as below: TTL=10.64; f1=−3.21; f2=3.67; f3=5.73; f=1.27;

$f3/f=4.5;$ $ImgH/D=0.46;$ $(R3+R4)/(R3-R4)=0.49;$ $(R5+R6)/(R5-R6)=1.11;$

System parameter: Fno. is 2.8

TABLE 7

| No. of surface | Surface type | Curvature radius | Thickness | Material | Conic coefficient |
|---|---|---|---|---|---|
| obj | spherical | infinity | 467.0000 | | |
| 1 | aspheric | −1.1657 | 0.4679 | 1.5351/55.779 | −7.9657 |
| 2 | aspheric | −4.2718 | 0.6078 | | −197.4554 |
| 3 | spherical | infinity | 2.5670 | 1.5168/64.198 | |
| 4 | spherical | infinity | 0.2031 | | |
| stop | spherical | infinity | 1.3200 | | |
| 6 | aspheric | 7.2110 | 1.6244 | 1.5351/55.779 | −113.1454 |
| 7 | aspheric | −2.4405 | 0.0500 | | −2.2567 |
| 8 | spherical | −64.3842 | 0.9000 | 1.6385/55.449 | |

TABLE 7-continued

| No. of surface | Surface type | Curvature radius | Thickness | Material | Conic coefficient |
|---|---|---|---|---|---|
| 9 | spherical | −3.4327 | 2.9022 | | |
| IMG | spherical | infinity | | | |

The table below shows high-order coefficients A4, A6, A8, A10 and A12 of aspheric shapes of the aspheric lens.

TABLE 8

| No. of surface | A4 | A6 | A8 | A10 | A12 | A14 | A16 |
|---|---|---|---|---|---|---|---|
| 1 | 1.0906E−01 | −3.8592E−02 | 7.7024E−03 | 4.1868E−05 | −4.6155E−04 | 1.1588E−04 | −1.0222E−05 |
| 2 | 3.0748E−01 | −2.1935E−01 | 2.6510E−01 | −1.6160E−01 | −3.3563E−03 | 4.8965E−02 | −1.4900E−02 |
| 6 | 1.4424E−03 | 2.6764E−03 | −4.3362E−03 | 4.5128E−04 | −1.9827E−03 | 1.1772E−03 | 3.0526E−04 |
| 7 | −7.0733E−03 | −9.4089E−04 | 2.4840E−03 | −1.3392E−03 | 1.1284E−03 | −7.7586E−04 | 1.7837E−04 |

Figure 21:
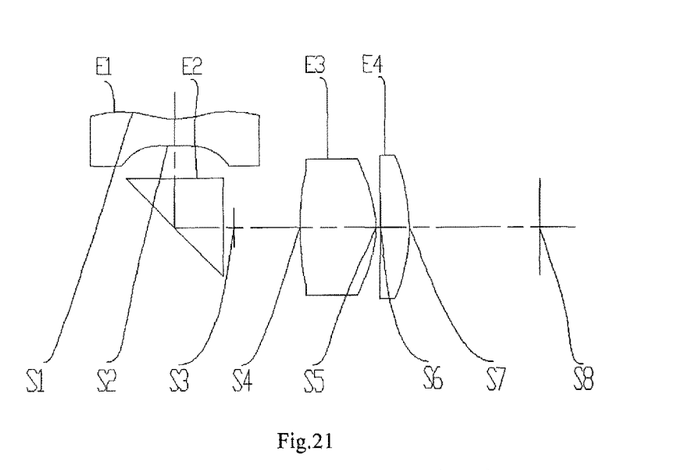
FIG. 21 is a schematic view showing a main structure of the projection lens according to Embodiment 5 of the present disclosure.

Referring to FIG. 21, in Embodiment 5, the projection lens includes a first lens E1, a reflective optical device E2, a second lens E3 and a third lens E4 from an image side of the projection lens to an object side of the projection lens in turn, wherein the first lens E1 is of a negative focal power, an image side of the first lens is concave and an object side of the first lens is concave, each of the image side and the object side thereof is in an aspheric shape; the reflective optical device E2 enables a light path to be bended; the second lens E3 is of a positive focal power, an image side of the second lens is convex and an object side of the second lens is convex, each of the image side and the object side thereof is in an aspheric shape; the third lens E4 is of a positive focal power, an image side of the third lens is concave and an object side of the third lens is convex, each of the image side and the object side thereof is in a spherical shape; a diaphragm is arranged between the first lens E1 and the second lens E3; in the projection lens, the third lens E4 is made of a glass material.

From an image side of the projection lens to an object side of the projection lens in turn, there are two side S1 and S2 of the first lens E1, a diaphragm S3, two side S4 and S5 of the second lens E3, two side S6 and S7 of the third lens E4 and the surface of the object is S8.

In Embodiment 5, each of the parameters is described as below: TTL=9.08; f1=−2.42; f2=2.94; f3=5.53; f=1.05;

$f3/f=5.27;$ $ImgH/D=0.42;$ $(R3+R4)/(R3-R4)=0.34;$ $(R5+R6)/(R5-R6)=1.03;$

System parameter: Fno. is 2.8

TABLE 9

| No. of surface | Surface type | Curvature radius | Thickness | Material | Conic coefficient |
|---|---|---|---|---|---|
| obj | spherical | infinity | 467.0000 | | |
| 1 | aspheric | −1.4646 | 0.5140 | 1.5351/55.779 | −9.0527 |
| 2 | aspheric | 11.1734 | 0.6292 | | −14.7194 |
| 3 | spherical | infinity | 1.9948 | 1.5168/64.198 | |
| 4 | spherical | infinity | 0.0752 | | |
| stop | spherical | infinity | 1.2635 | | |
| 6 | aspheric | 4.3484 | 1.4499 | 1.5351/55.779 | −39.3139 |
| 7 | aspheric | −2.1280 | 0.0921 | | −2.6316 |
| 8 | spherical | −240.4137 | 0.5721 | 1.6385/55.449 | |
| 9 | spherical | −3.4338 | 2.4930 | | |
| IMG | spherical | infinity | | | |

The table below shows high-order coefficients A4, A6, A8, A10 and A12 of aspheric shapes of the aspheric lens.

TABLE 10

| No. of surface | A4 | A6 | A8 | A10 | A12 | A14 | A16 |
|---|---|---|---|---|---|---|---|
| 1 | 1.1219E−01 | −3.8530E−02 | 7.6289E−03 | 5.1083E−05 | −4.7277E−04 | 1.1072E−04 | −7.5456E−06 |
| 2 | 3.5996E−01 | −2.0618E−01 | 2.6867E−01 | −1.5763E−01 | −1.4009E−03 | 5.6362E−02 | −1.8603E−02 |
| 6 | 5.8884E−03 | 7.4942E−03 | −1.1417E−04 | 2.2185E−03 | −1.6260E−03 | 8.9247E−04 | −1.5336E−04 |
| 7 | −8.9700E−03 | −6.0808E−04 | 2.8704E−03 | −7.5844E−04 | 1.6350E−03 | −6.8646E−04 | 1.2246E−04 |

Figure 26:
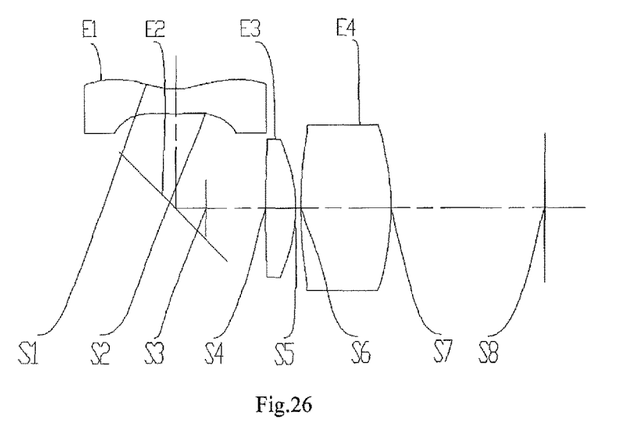
FIG. 26 is a schematic view showing a main structure of the projection lens according to Embodiment 6 of the present disclosure.

Referring to FIG. 26, in Embodiment 6, the projection lens includes a first lens E1, a reflective optical device E2, a second lens E3 and a third lens E4 from an image side of the projection lens to an object side of the projection lens in turn, wherein the first lens E1 is of a negative focal power, an image side of the first lens is concave and an object side of the first lens is convex, each of the image side and the object side thereof is in an aspheric shape; the reflective optical device E2 enables a light path to be bended; the second lens E3 is of a positive focal power, an image side of the second lens is convex and an object side of the second lens is convex, each of the image side and the object side thereof is in an aspheric shape; the third lens E4 is of a positive focal power, an image side of the third lens is convex and an object side of the third lens is convex, each of the image side and the object side thereof is in a spherical shape; a diaphragm is arranged between the first lens E1 and the second lens E3; in the projection lens, the third lens E4 is made of a glass material.

From the image side of the projection lens to the object side of the projection lens, two sides of the first lens E1 are S1 and S2, respectively; the diaphragm is S3; two sides of the second lens E3 are S4 and S5, respectively; two sides of the third lens E4 are S6 and S7, respectively; and the side of the object is S8, wherein both sides of the coordinate break are two specific sides of reflecting plane mirror designed by zemax optical design software. Various changes made according to characteristics of software, which may achieve the reflecting plane mirror, fall within in the scope of the disclosure.

In Embodiment 6, each of the parameters is described as below: TTL=7.22; f1=−3.58; f2=4.41; f3=5.53; f=1.66;

$f3/f=3.33;$ $ImgH/D=0.53;$ $(R3+R4)/(R3−R4)=0.74;$ $(R5+R6)/(R5−R6)=0.25;$

System parameter: Fno. is 2.8

Figure 5:
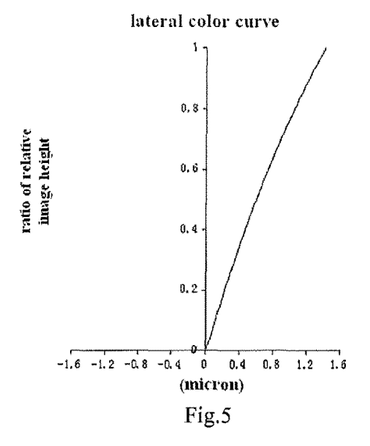
FIG. 5 is a diagram showing a lateral color curve (μm) of the projection lens in Embodiment 1.

Embodiment 1; and FIG. 5 is a diagram showing a lateral color curve (μm) of the projection lens in Embodiment 1.

Figure 7:
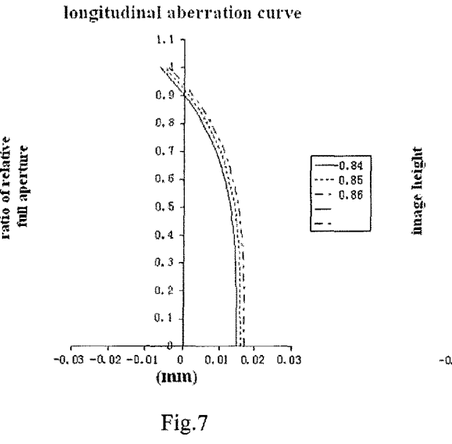
FIG. 7 is a diagram showing a longitudinal aberration curve (mm) of the projection lens in Embodiment 2.
Figure 8:
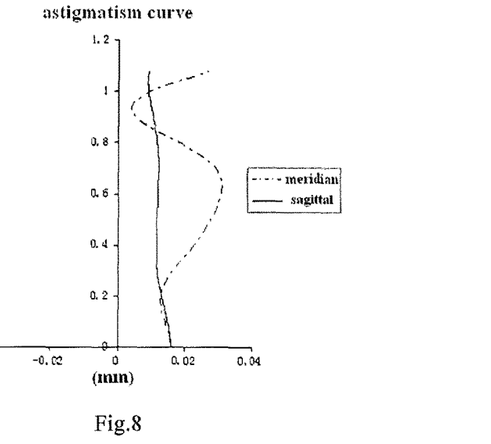
FIG. 8 is a diagram showing an astigmatism curve (mm) of the projection lens in Embodiment 2.
Figure 9:
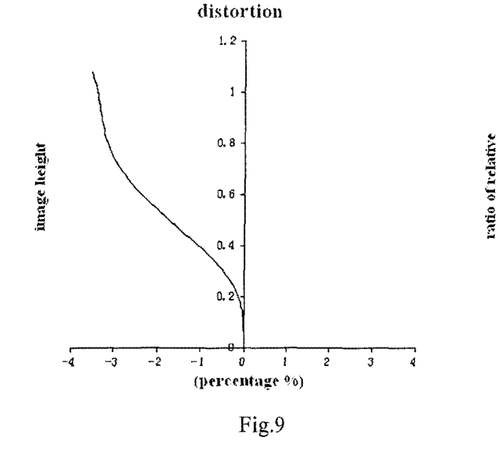
FIG. 9 is a diagram showing a distortion curve (%) of the projection lens in Embodiment 2.
Figure 10:
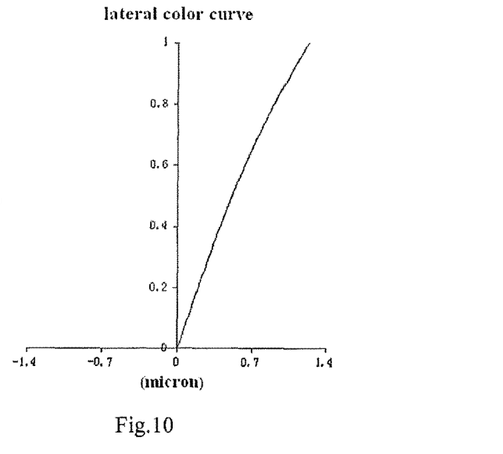
FIG. 10 is a diagram showing a lateral color curve (μm) of the projection lens in Embodiment 2.

FIG. 7 is a diagram showing a longitudinal aberration curve (mm) of the projection lens in Embodiment 2; FIG. 8 is a diagram showing an astigmatism curve (mm) of the projection lens in Embodiment 2; FIG. 9 is a diagram showing a distortion curve (%) of the projection lens in Embodiment 2; and FIG. 10 is a diagram showing a lateral color curve (μm) of the projection lens in Embodiment 2.

Figure 12:
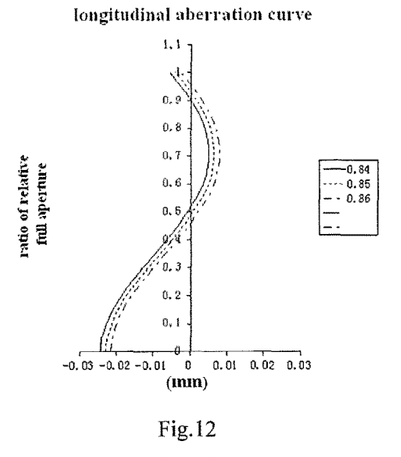
FIG. 12 is a diagram showing a longitudinal aberration curve (mm) of the projection lens in Embodiment 3.
Figure 13:
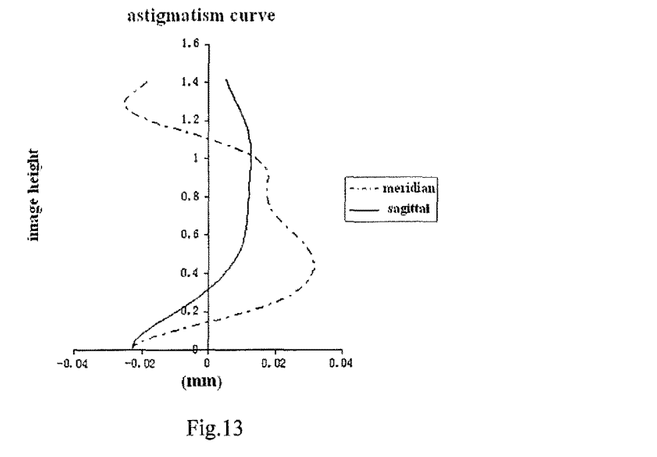
FIG. 13 is a diagram showing an astigmatism curve (mm) of the projection lens in Embodiment 3.
Figure 14:
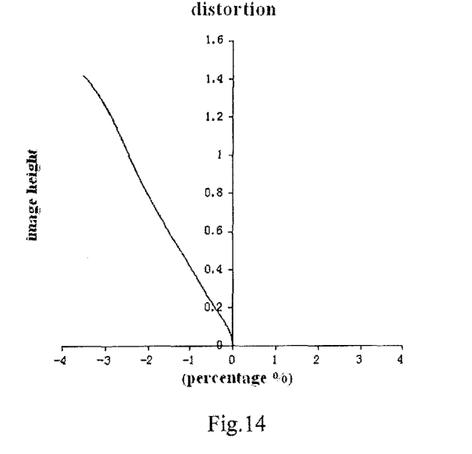
FIG. 14 is a diagram showing a distortion curve (%) of the projection lens in Embodiment 3.
Figure 15:
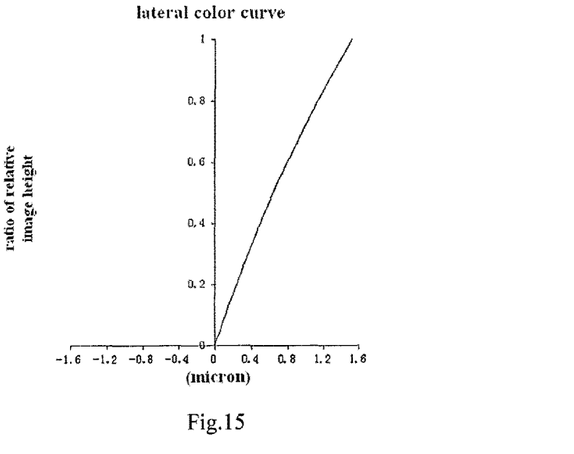
FIG. 15 is a diagram showing a lateral color curve (μm) of the projection lens in Embodiment 3.

FIG. 12 is a diagram showing a longitudinal aberration curve (mm) of the projection lens in Embodiment 3; FIG. 13 is a diagram showing an astigmatism curve (mm) of the projection lens in Embodiment 3; FIG. 14 is a diagram showing a distortion curve (%) of the projection lens in Embodiment 3; and FIG. 15 is a diagram showing a lateral color curve (μm) of the projection lens in Embodiment 3.

Figure 17:
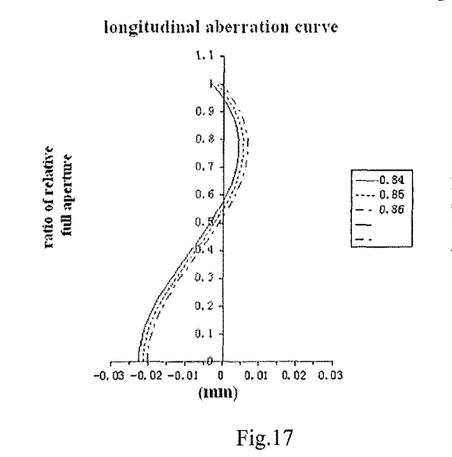
FIG. 17 is a diagram showing a longitudinal aberration curve (mm) of the projection lens in Embodiment 4.
Figure 18:
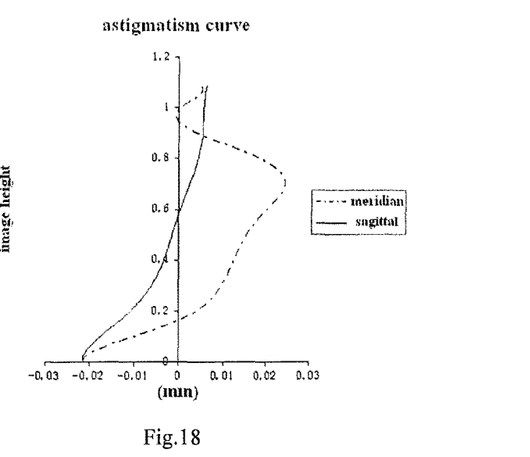
FIG. 18 is a diagram showing an astigmatism curve (mm) of the projection lens in Embodiment 4.
Figure 19:
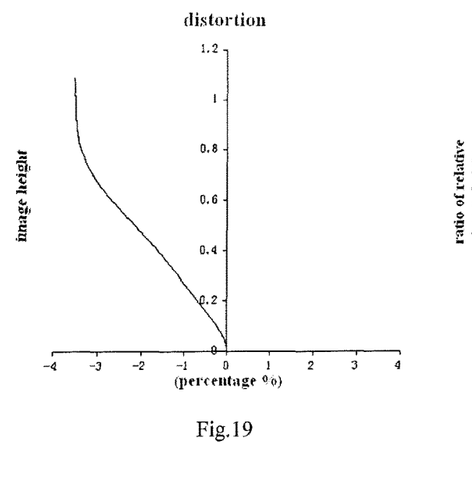
FIG. 19 is a diagram showing a distortion curve (%) of the projection lens in Embodiment 4.
Figure 20:
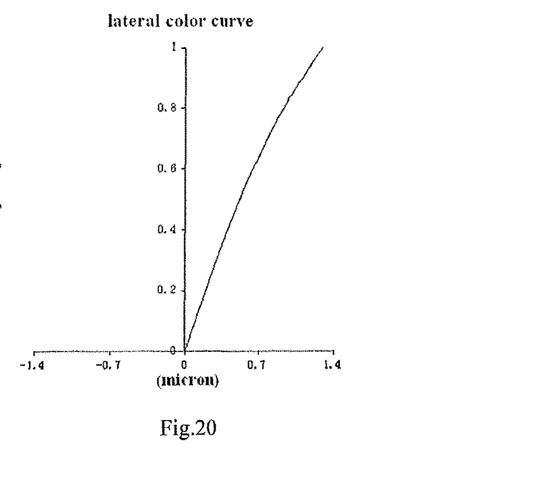
FIG. 20 is a diagram showing a lateral color curve (μm) of the projection lens in Embodiment 4.

FIG. 17 is a diagram showing a longitudinal aberration curve (mm) of the projection lens in Embodiment 4; FIG. 18 is a diagram showing an astigmatism curve (mm) of the projection lens in Embodiment 4; FIG. 19 is a diagram showing a distortion curve (%) of the projection lens in Embodiment 4; and FIG. 20 is a diagram showing a lateral color curve (μm) of the projection lens in Embodiment 4.

Figure 22:
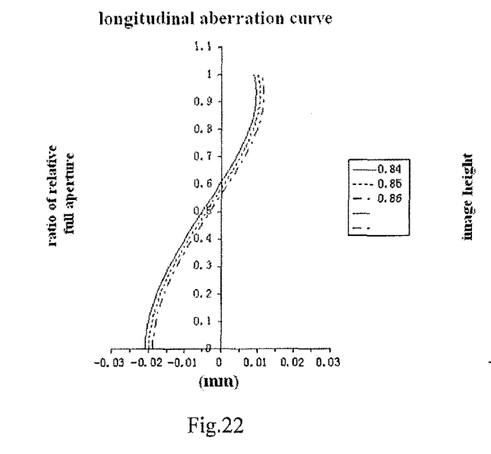
FIG. 22 is a diagram showing a longitudinal aberration curve (mm) of the projection lens in Embodiment 5.
Figure 23:
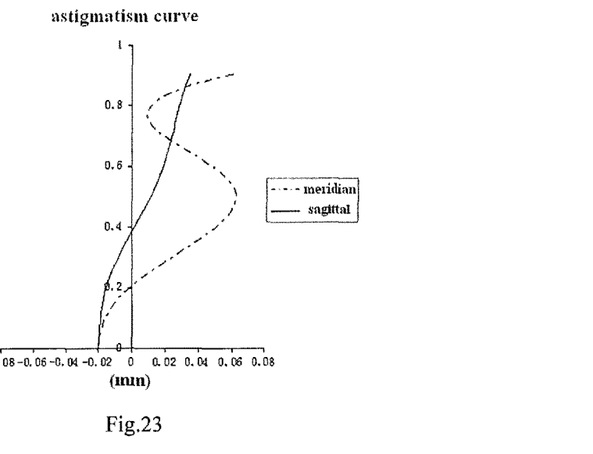
FIG. 23 is a diagram showing an astigmatism curve (mm) of the projection lens in Embodiment 5.
Figure 24:
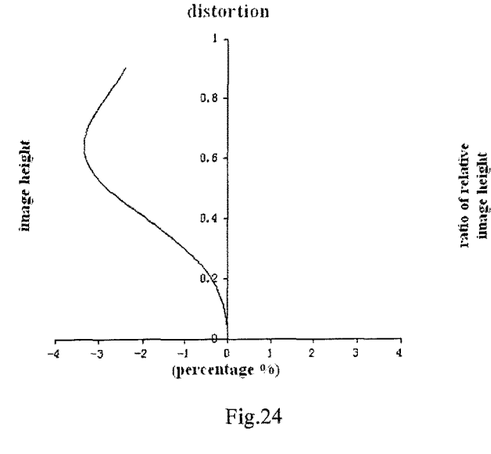
FIG. 24 is a diagram showing a distortion curve (%) of the projection lens in Embodiment 5.
Figure 25:
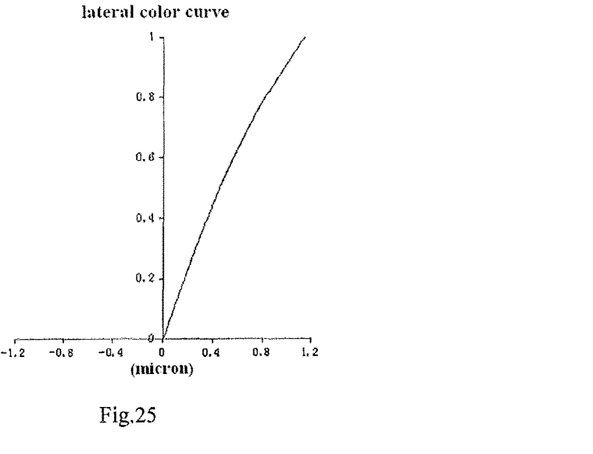
FIG. 25 is a diagram showing a lateral color curve (μm) of the projection lens in Embodiment 6.

FIG. 22 is a diagram showing a longitudinal aberration curve (mm) of the projection lens in Embodiment 5; FIG. 23 is a diagram showing an astigmatism curve (mm) of the projection lens in Embodiment 5; FIG. 24 is a diagram showing a distortion curve (%) of the projection lens in Embodiment 5; and FIG. 25 is a diagram showing a lateral color curve (μm) of the projection lens in Embodiment 5.

Figure 27:
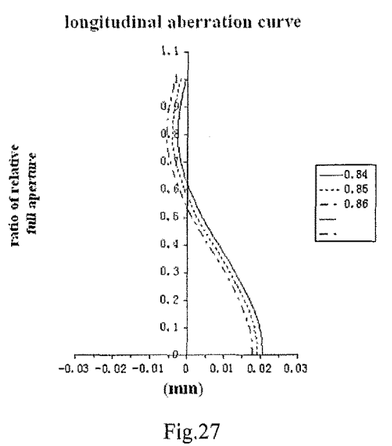
FIG. 27 is a diagram showing a longitudinal aberration curve (mm) of the projection lens in Embodiment 6.
Figure 28:
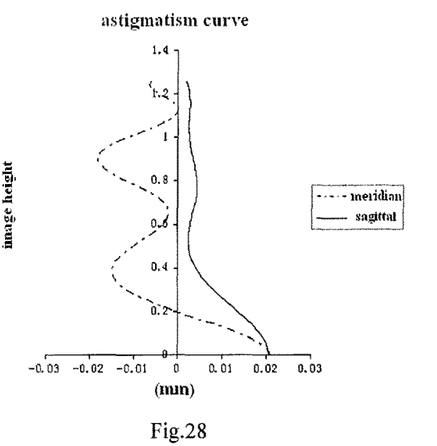
FIG. 28 is a diagram showing an astigmatism curve (mm) of the projection lens in Embodiment 6.

FIG. 27 is a diagram showing a longitudinal aberration curve (mm) of the projection lens in Embodiment 6; FIG. 28 is a diagram showing an astigmatism curve (mm) of the

TABLE 11

| No. of surface | Surface type | Curvature radius | Thickness | Material | Conic coefficient |
| --- | --- | --- | --- | --- | --- |
| obj | spherical | infinity | 467.0000 | | |
| 1 | aspheric | −1.2163 | 0.4836 | 1.5351/55.7797 | −7.0477 |
| 2 | aspheric | −3.8848 | 1.9000 | | −94.5295 |
| 3 | coordinate break | | 0.0000 | | |
| 4 | spherical | infinity | 0.0000 | 1.5168/64.1983 | |
| 5 | coordinate break | | −0.5700 | | |
| stop | spherical | infinity | −1.1751 | | |
| 7 | aspheric | −17.8461 | −0.6024 | 1.5351/55.7797 | −371.1687 |
| 8 | aspheric | 2.6404 | −0.1000 | | −1.8237 |
| 9 | spherical | −8.7790 | −1.7821 | 1.6385/55.4496 | |
| 10 | spherical | 5.3074 | −2.9945 | | |
| IMG | spherical | infinity | | | |

The table below shows high-order coefficients A4, A6, A8, A10 and A12 of aspheric shapes of the aspheric lens.

TABLE 12

| No. of surface | A4 | A6 | A8 | A10 | A12 | A14 | A16 |
| --- | --- | --- | --- | --- | --- | --- | --- |
| 1 | 1.0848E−01 | −3.8339E−02 | 7.7327E−03 | 3.9850E−05 | −4.6190E−04 | 1.1639E−04 | −1.0413E−05 |
| 2 | 2.9025E−01 | −2.0858E−01 | 2.6705E−01 | −1.6210E−01 | −3.2768E−03 | 4.9433E−02 | −1.4619E−02 |
| 7 | 7.6979E−04 | −4.3541E−03 | 2.3774E−03 | −1.4695E−03 | 1.7607E−03 | −9.0937E−04 | 2.2329E−04 |
| 8 | 7.3643E−03 | −8.5003E−04 | −2.5492E−03 | 1.5015E−03 | −1.0432E−03 | 7.9880E−04 | −1.7294E−04 |

Figure 2:
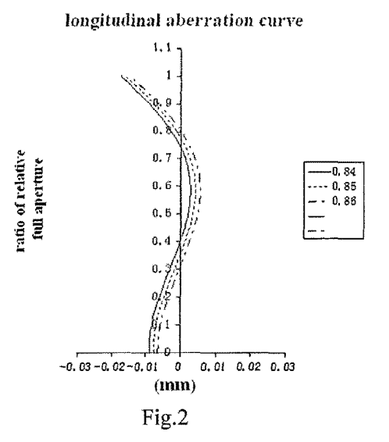
FIG. 2 is a diagram showing a longitudinal aberration curve (mm) of the projection lens in Embodiment 1.
Figure 3:
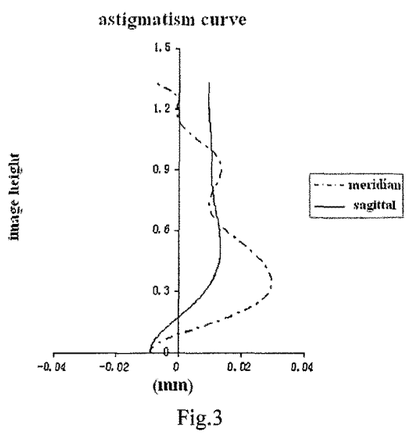
FIG. 3 is a diagram showing an astigmatism curve (mm) of the projection lens in Embodiment 1.
Figure 4:
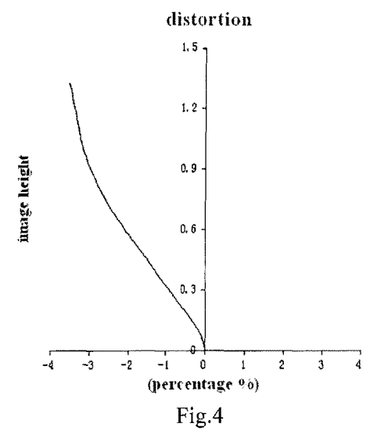
FIG. 4 is a diagram showing a distortion curve (%) of the projection lens in Embodiment 1.
Figure 29:
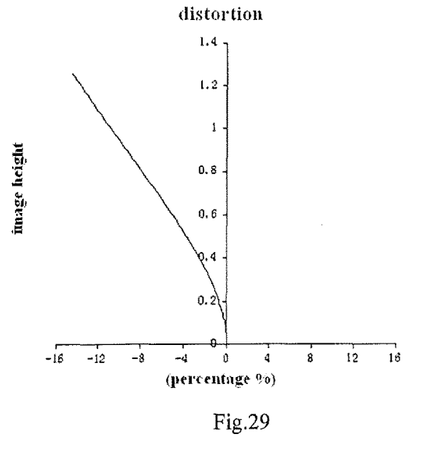
FIG. 29 is a diagram showing a distortion curve (%) of the projection lens in Embodiment 6.
Figure 30:
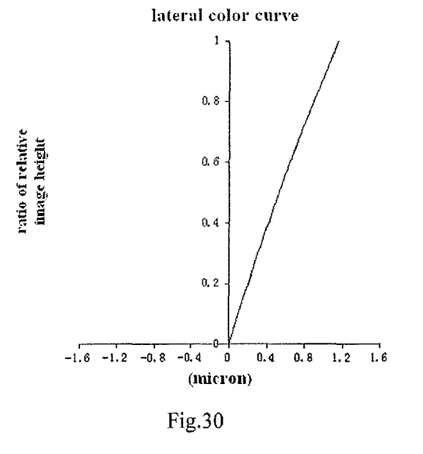
FIG. 30 is a diagram showing a lateral color curve (μm) of the projection lens in Embodiment 6.

FIG. 2 is a diagram showing a longitudinal aberration curve (mm) of the projection lens in Embodiment 1; FIG. 3 is a diagram showing an astigmatism curve (mm) of the projection lens in Embodiment 1; FIG. 4 is a diagram showing a distortion curve (%) of the projection lens in projection lens in Embodiment 6; FIG. 29 is a diagram showing a distortion curve (%) of the projection lens in Embodiment 6; and FIG. 30 is a diagram showing a lateral color curve (μm) of the projection lens in Embodiment 6.

With a diagram showing a longitudinal aberration curve, a diagram showing an astigmatism curve, a diagram showing a distortion curve and a diagram showing a lateral color curve of the projection lens in each Embodiment, it can be seen that the projection lens according to embodiments of the present disclosure has good optical properties.

Although explanatory embodiments and principle of the present disclosure have been described for the projection lens, with the teaching described above of the present disclosure, various amendments and modifications can be made by those skilled in the art based on the embodiments described above, within in the scope of the disclosure. Those skilled in the art should understand that the detailed description above is only for illustrative purposes of the present disclosure and are not intended to limit the present disclosure. The scope of the present disclosure is defined by the claims and the like.

What is claimed is:

1. A projection lens, comprising a first lens, a reflective optical device, a second lens and a third lens from an image side of the projection lens to an object side of the projection lens in turn, wherein the first lens is of a negative focal power, an image side of the first lens is concave;

the reflective optical device enables a light path to be bended;

the second lens is of a positive focal power, an object side of the second lens is convex; and the third lens is of a positive focal power, an object side of the third lens is convex, wherein a diaphragm is arranged between the first lens and the second lens, the projection lens meets the following formulas:

$$0.4 < ImgH/D < 0.7, \text{ and}$$

$$3 \leq f3/f < 6,$$

wherein ImgH equals to a half-length of an object diagonal,

D represents a vertical height from the image side of the first lens to a center axis perpendicular to an object, f3 represents a focal length of the third lens, and f represents a focal length of the lens assembly.

2. The projection lens according to claim 1, wherein each of the first lens and the second lens has two sides both being in an aspheric shape, the third lens has two sides both being in a spherical shape.

3. The projection lens according to claim 2, wherein the third lens is made of a glass material.

4. The projection lens according to claim 1, wherein the projection lens meets the following formula:

$$0.2 < (R3+R4)/(R3-R4) < 1.2,$$

wherein R3 represents a curvature radius of an image side of the second lens, R4 represents a curvature radius of the object side of the second lens.

5. The projection lens according to claim 4, wherein the projection lens meets the following formula:

$$0.2 < (R5+R6)/(R5-R6) < 1.2,$$

wherein R5 represents a curvature radius of an image side of the third lens, R6 represents a curvature radius of the object side of the third lens.

6. The projection lens according to claim 1, wherein an object side of the first lens is convex.

7. The projection lens according to claim 6, wherein the image side of the second lens is convex.

8. The projection lens according to claim 7, wherein the image side of the third lens is convex.

9. The projection lens according to claim 1, wherein the reflective optical device enabling the light path to be bended is a reflecting prism or a reflecting plane mirror.

10. The lens assembly according to claim 2, wherein an object side of the first lens is convex.

11. The lens assembly according to claim 3, wherein an object side of the first lens is convex.

12. The lens assembly according to claim 4, wherein an object side of the first lens is convex.

13. The lens assembly according to claim 5, wherein an object side of the first lens is convex.

14. The lens assembly according to claim 2, wherein the reflective optical device enabling the light path to be bended is a reflecting prism or a reflecting plane mirror.

15. The lens assembly according to claim 3, wherein the reflective optical device enabling the light path to be bended is a reflecting prism or a reflecting plane mirror.

16. The lens assembly according to claim 4, wherein the reflective optical device enabling the light path to be bended is a reflecting prism or a reflecting plane mirror.

17. The lens assembly according to claim 5, wherein the reflective optical device enabling the light path to be bended is a reflecting prism or a reflecting plane mirror.

18. The lens assembly according to claim 6, wherein the reflective optical device enabling the light path to be bended is a reflecting prism or a reflecting plane mirror.

19. The lens assembly according to claim 7, wherein the reflective optical device enabling the light path to be bended is a reflecting prism or a reflecting plane mirror.

* * * * *